United States Patent
Solem et al.

(10) Patent No.: US 9,311,756 B2
(45) Date of Patent: Apr. 12, 2016

(54) IMAGE GROUP PROCESSING AND VISUALIZATION

(71) Applicant: Apple Inc., Cupertino, CA (US)

(72) Inventors: Jan Erik Solem, Bjarred (SE); Yubin Kuang, Lund (SE)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 13/756,914

(22) Filed: Feb. 1, 2013

(65) Prior Publication Data

US 2014/0218353 A1    Aug. 7, 2014

(51) Int. Cl.
*G06T 15/00* (2011.01)
*G06T 19/20* (2011.01)
*G06T 11/60* (2006.01)

(52) U.S. Cl.
CPC ............... *G06T 19/20* (2013.01); *G06T 11/60* (2013.01); *G06T 2219/2004* (2013.01)

(58) Field of Classification Search
CPC .............. G06F 3/04883; G06F 1/1626; G06F 2203/04805; G06F 2203/04806
USPC .......................................................... 345/419
See application file for complete search history.

(56) References Cited

U.S. PATENT DOCUMENTS

| | | | |
|---|---|---|---|
| 8,593,485 B1 * | 11/2013 | Anguelov et al. ............. | 345/619 |
| 2004/0004626 A1 * | 1/2004 | Ida et al. ....................... | 345/626 |
| 2008/0165160 A1 | 7/2008 | Kocienda et al. | |
| 2009/0021513 A1 * | 1/2009 | Joshi et al. .................... | 345/419 |
| 2010/0235770 A1 | 9/2010 | Ording et al. | |

OTHER PUBLICATIONS

Rublee et al.; "ORB: An efficient alternative to SIFT or SURF"; 2011; ICCV '11 Proceedings of the 2011 International Conference on Computer Vision, pp. 1-8.*

* cited by examiner

*Primary Examiner* — Peter Hoang
(74) *Attorney, Agent, or Firm* — Schwegman, Lundberg & Woessner, P.A.

(57) ABSTRACT

Techniques are provided for efficiently generating 3D information from a set of digital images. Techniques are also provided for displaying groups (or clusters) of digital images using 3D information associated with the digital images. In one technique, a group of digital images are displayed as a stack of thumbnail images where the thumbnail images are aligned on a display with respect to each other based on common features identified in the digital images, camera position, and/or camera pose. In another technique, a group of digital images are organized on a display in either a 3D layout or a 2D layout based on 3D information associated with each digital image in the group. In another technique, a transition effect is generated based on projections of two digital images onto a common scene plane and blending (or cross fading) one of the 3D projections with the other of the 3D projections.

27 Claims, 14 Drawing Sheets

500

510
IDENTIFY (1) A FIRST IMAGE THAT INCLUDES A FIRST IMAGE REGION AND (2) A SECOND IMAGE THAT INCLUDES A SECOND IMAGE REGION THAT CORRESPONDS TO THE FIRST IMAGE REGION

520
CONCURRENTLY DISPLAY THE FIRST IMAGE AND AT LEAST A FIRST PORTION OF THE SECOND IMAGE SUCH THAT THE FIRST IMAGE REGION IS ALIGNED WITH THE SECOND IMAGE REGION AND AT LEAST A SECOND PORTION OF THE SECOND IMAGE IS OBSTRUCTED BY THE FIRST IMAGE

*FIG. 5*

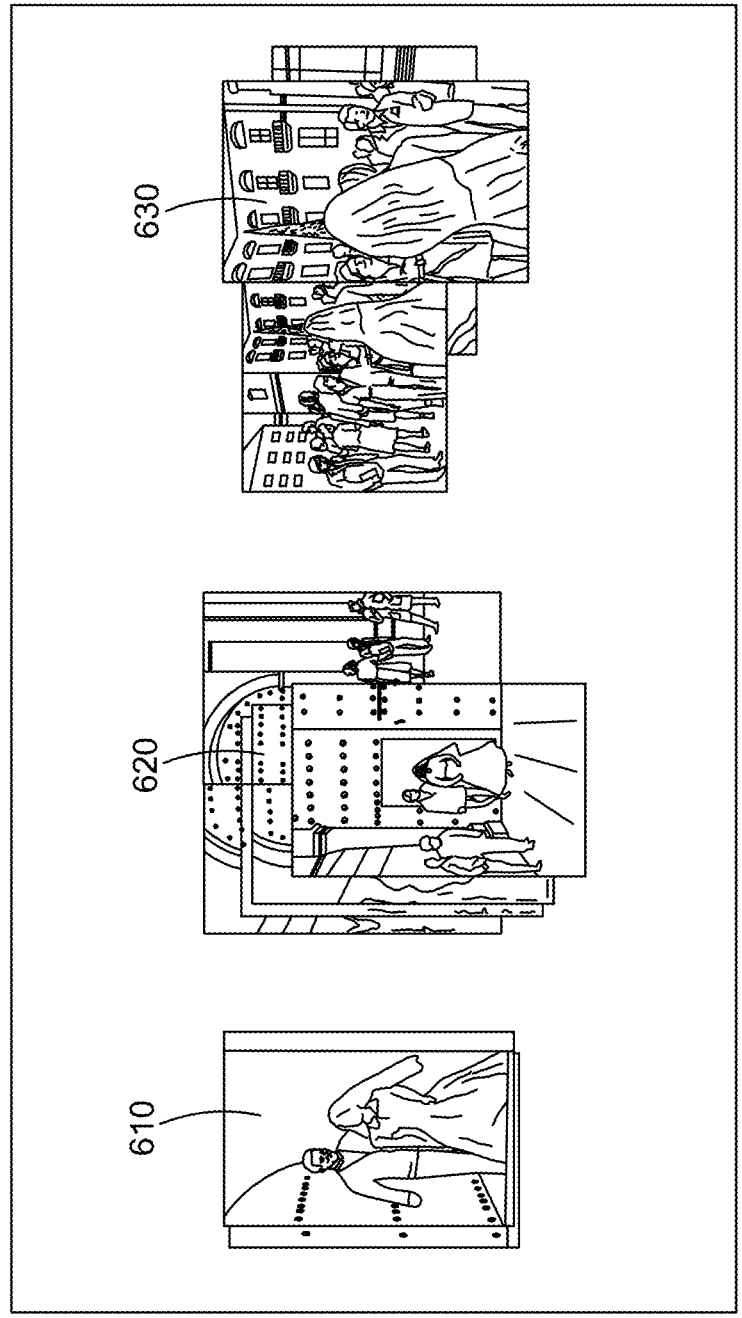

IMAGE GROUP PROCESSING AND VISUALIZATION

FIELD OF THE INVENTION

The present invention generally relates to image processing and, more specifically, to identifying groups of related images and visualizing and navigating the groups of related images.

BACKGROUND

Photo management applications are used to manage a collection of digital images. Photo management applications may be used to store and retrieve digital images to and from a storage medium, such as a hard drive. Certain photo management applications may also be used to perform an edit operation on a digital image that causes a change in a visual characteristic (e.g., contrast, brightness, etc.) of the digital image.

Some photo management applications organize digital images into groups based on time or content (such as a face that is detected in a set of images). Regardless of how images are organized, the manner in which the images are displayed is typically the same. Current photo management applications do not generate 3D information or use 3D information in displaying digital images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for efficiently generating 3D information. In one technique, a first plurality of descriptors that are associated with a first image are identified and a second plurality of descriptors that are associated with a second image are identified. Each descriptor corresponds to a point in the respective image. A first set of visual words is determined based on the first plurality of descriptors and a first set of visual word frequencies is determined based on the first set of visual words. Similarly, a second set of visual words is determined based on the second plurality of descriptors and a second set of visual word frequencies is determined based on the second set of visual words. A comparison between the first set of visual word frequencies and the second set of visual word frequencies is performed. Based on the comparison, it is determined whether to associate the first image with the second image.

Techniques are also provided for organizing digital images into groups, viewing the groups, and navigating the groups on a display. In one such technique, at least two images are identified. A first image includes a first image region and a second image includes a second image region that corresponds to the first image region. The image regions may be identified based on 3D information associated with the first and second images. The first image and at least a first portion of the second image are displayed such that the first image region is aligned with the second image region and at least a second portion of the second image is obstructed by the first image.

In another technique, 3D information is used to display multiple digital images in a group in a 2D (or "flat") layout. The digital images are positioned, on a display, relative to each other based on one or more 3D attributes of each digital image, such as pose and/or position of an image capture device.

In another technique, 3D information is used to create a transition effect between two digital images of a group. As preliminary steps, a first digital image is projected onto a 3D scene plane to produce a first computer-generated (or projected) image and a second digital image is projected onto the 3D scene plane to produce a second computer-generated image. A transition between the first computer-generated image and the second computer-generated image is then displayed.

BRIEF DESCRIPTION OF THE DRAWINGS

In the drawings:

FIG. 5 is a flow diagram that depicts a process for aligning images in a stack, in an embodiment;

FIG. 6 is a diagram that depicts stacks that are aligned based on common scenes or objects, in an embodiment.

DETAILED DESCRIPTION

Figure 1A:
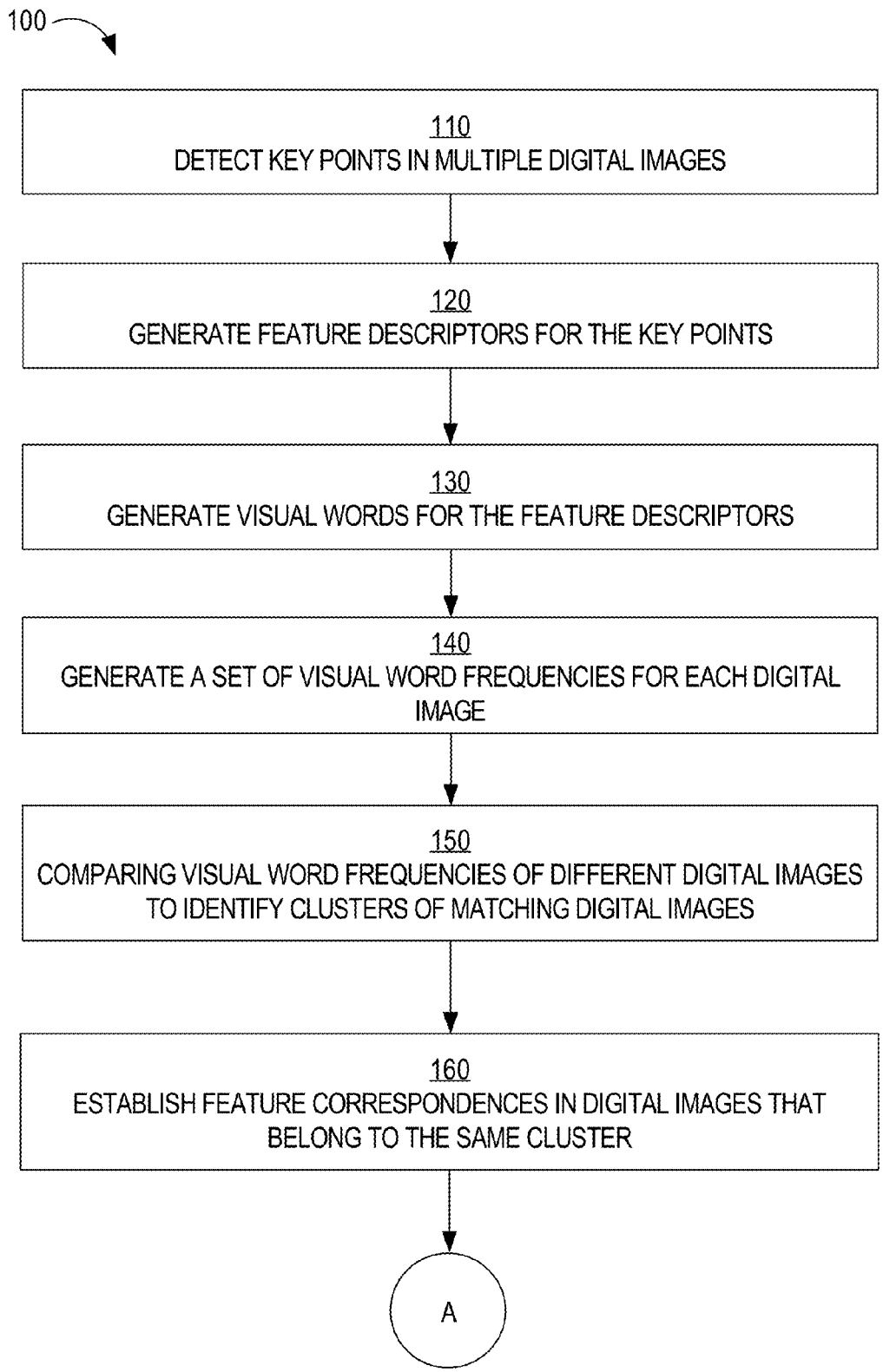
FIGS. 1A-1B are flow diagrams that depict a process for generating 3D information based on a set of digital images, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the common vernacular, a digital picture or digital image may either refer to an image file that may be processed to display an image or the actual image itself. As used herein, digital image data refers to digital data that may be processed to display a digital image or photo. For example, non-limiting, illustrative examples of digital image data include a .BMP file, a .JPEG file, a .TIF file, or a .GIF file. Thus, a digital image or photo is the visual display of digital image data. However, in contexts where the distinction between the visual image rendered from digital image data and the digital image data itself is not important to understand how the embodiment of the invention works, a reference to a digital image or photo may follow the common vernacular and implicitly include reference to the digital image data used to display the digital image or digital picture. For example, a description of "storing a digital image" refers to storing digital image data which, when processed, causes the display of the digital image.

Embodiments are described herein according to the following outline:
 1.0. General Overview
 2.0. Image Processing Pipeline
 2.1 Keypoint Detection
 2.2 Feature Descriptor Generation
 2.3 Photo Matching
 2.4 Initialize SfM
 2.5 Adding Digital Images
 2.6 Storing Data
 3.0. User Interface Capabilities
 3.1 Cluster Association Data
 3.2 Stacks
   3.2.1 Stacks Based On Matching Features
   3.2.2 Aligning Digital Images In a Stack
   3.2.3 Transformations
   3.2.4 Pick Image In a Feature-Aligned Stack
   3.2.5 Scrubbing
   3.2.6 View Mode
 3.3 Navigation
   3.3.1 3D Layout
   3.3.2 2D Layout
 3.4 Slideshow Effects
 4.0. Hardware Overview 1.0 General Overview Techniques are described for generating a 3D representation of one or more objects reflected in images of that group, organizing digital images into groups or (clusters) based on features detected in the images, visualizing images of a group, navigating images of the group, and transitioning between images of the group. The visualizing and navigating may be based on a 3D representation of one or more objects detected in the images of a group, regardless of where or how the 3D representations were generated.

In an embodiment, these techniques are implemented in a digital image management application that is used to manage and display photos and that executes on a user device, such as a desktop computer, a laptop computer, a tablet computer, or a smartphone device. A digital image management application may be implemented in software, hardware, or any combination of software and hardware.

Although the following description refers to analyzing images, embodiments of the invention may include analyzing video clips in order to obtain 3D representations of objects.

Also, the following description refers to cameras and parameters associated with cameras, such as camera pose and camera position. However, a camera is merely one example of an image capture device that captures and stores images onto a medium that can be read by another device. Thus, embodiments of the invention are applicable to other types of image capture devices.

2.0 Image Processing Pipeline

In order to generate a 3D representation of an object or set of objects reflected in a set of images and/or video clips, one or more techniques are used to analyze the set of images. Embodiments of the invention are not limited to any particular technique for generating a 3D representation of an object. One technique is referred to herein as a "structure from motion" (SfM) technique. That technique involves many steps that may vary from one implementation to another. Some of those steps described below include keypoint detection and feature extraction, pair-wise photo matching, initialization of SfM with two photos, adding digital images, and storing data.

Figure 1B:
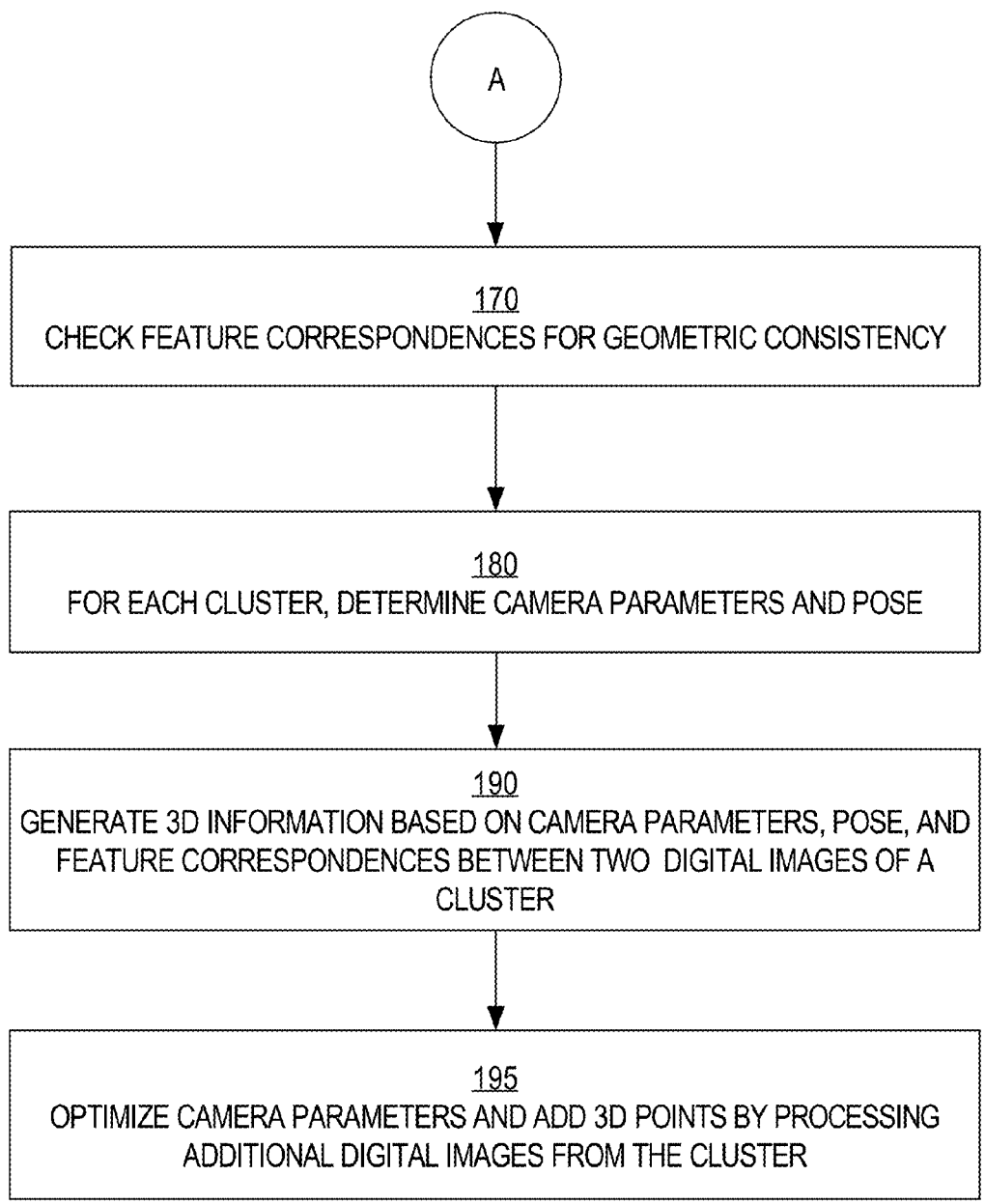

FIGS. 1A-1B are flow diagrams that depict a process 100 for generating 3D information based on a set of digital images, in an embodiment. Process 100 may be performed by a digital image management application. The digital images that are involved in process 100 may be all the digital images that belong to a user's collection of digital images, which collection may be stored on a single device (e.g., a laptop or desktop computer), on multiple devices owned by the user, and/or by a cloud service to which the user has subscribed for storage of the user's digital images. Alternatively, a user may select a set of digital images that will be analyzed as part of process 100, such that any non-selected digital images will not be analyzed during process 100. For example, the user may select a particular album of digital images, which may be organized by date, location, or common content (such as identified faces or objects). As another example, the user specifies one or more criteria, such as a date range, a specific location, and/or a person's name. As a result, the digital image management application identifies digital images that satisfy the one or more criteria, after which the management application executes process 100 against the identified digital images. As another example, the user selects individual digital images, for example, by selecting thumbnails (or smaller versions) of the digital images and/or selecting (e.g., file) names of the digital images.

Process 100 may be performed automatically (e.g., "in the background") without requiring any user input to initiate process 100. A portion of process 100 may be performing in response to an addition of a set of one or more digital images to a collection of digital images. For example, a user may take fifty pictures using a digital camera. The user then initiates a transfer of the fifty pictures from the digital camera to a computing device, such as a desktop computer or a laptop computer. The computing device executes a digital image management application. Examples of digital image management applications include iPhoto™ and Aperture™. The digital image management application detects the "new" digital images and initiates process 100 (or a portion thereof) relative to the new digital images.

2.1 Keypoint Detection

At block 110, digital image data of multiple digital images is analyzed to detect one or more keypoints reflected in the digital image data. "Keypoints" are also referred to herein as "feature points." Feature points in a digital image are points that are considered "interesting" based on one or more criteria. A feature point identifies an actual location in a digital image. A feature point may be in any format. For example, one format of a feature point is a two-value tuple, such as "(20, 38)". The first value may correspond to the X-axis while the second value may correspond to the Y-axis. Another format of a feature point is a single value, where the single value is an index into a digital image.

Embodiments of the invention are not limited to any particular technique for identifying keypoints. Examples of keypoint detection techniques include SIFT (Scale-invariant feature transform), SURF (Speeded Up Robust Features), and ORB (Oriented FAST and Rotated BRIEF).

2.2 Feature Descriptor Generation

At block 120, feature descriptors are generated for the identified feature points. Feature descriptors are used for determining whether two digital images match.

Embodiments of the invention are not limited to any particular format of a feature descriptor. Examples of feature descriptor generation techniques include the same keypoint detection techniques referred to previously, namely, SIFT, SURF, and ORB.

A feature descriptor "describes," in numerical form, one or more attributes of a feature point. A feature descriptor may be a multi-dimensional vector, as in SIFT.

2.3 Photo Matching

Once feature descriptors are generated for multiple digital images, digital images are compared with each other. Such a comparison involves using feature descriptors associated with the multiples digital images and includes multiple steps.

At block 130, "visual words" or code words are generated based on the feature descriptors. A "visual word" is the result of quantizing a feature descriptor. A visual word may be only one or a few bytes in size (such as a one-byte number or two-byte character), instead of potentially hundreds of bytes that a single feature descriptor may require.

If a digital image is associated with thirty feature descriptors, then thirty visual words may be generated. A visual word may be considered representative of several similar feature descriptors. Thus, if two feature descriptors are similar enough, then the two feature descriptors may map to the same visual word. Once visual words are generated for feature descriptors of a digital image, process 100 proceeds to block 140.

At block 140, visual word frequencies are determined for a digital image. Determining visual word frequencies involves counting the number of each distinct visual word associated with a digital image. Visual word frequencies associated with a digital image may be represented as a sparse vector, where each entry in the vector corresponds to a different visual word. Once visual word frequencies are generated for multiple digital images, process 100 proceeds to block 150.

At block 150, visual word frequencies associated with different digital images are compared to determine whether two digital images "match." A "match" does not require an exact match, such that each digital image is associated with the same number of each distinct visual word. Instead, one or more thresholds may be defined and used that indicates whether two sets of visual words frequencies match. The visual word frequencies may be weighted (e.g., tf-idf) during this matching step.

Figure 2:
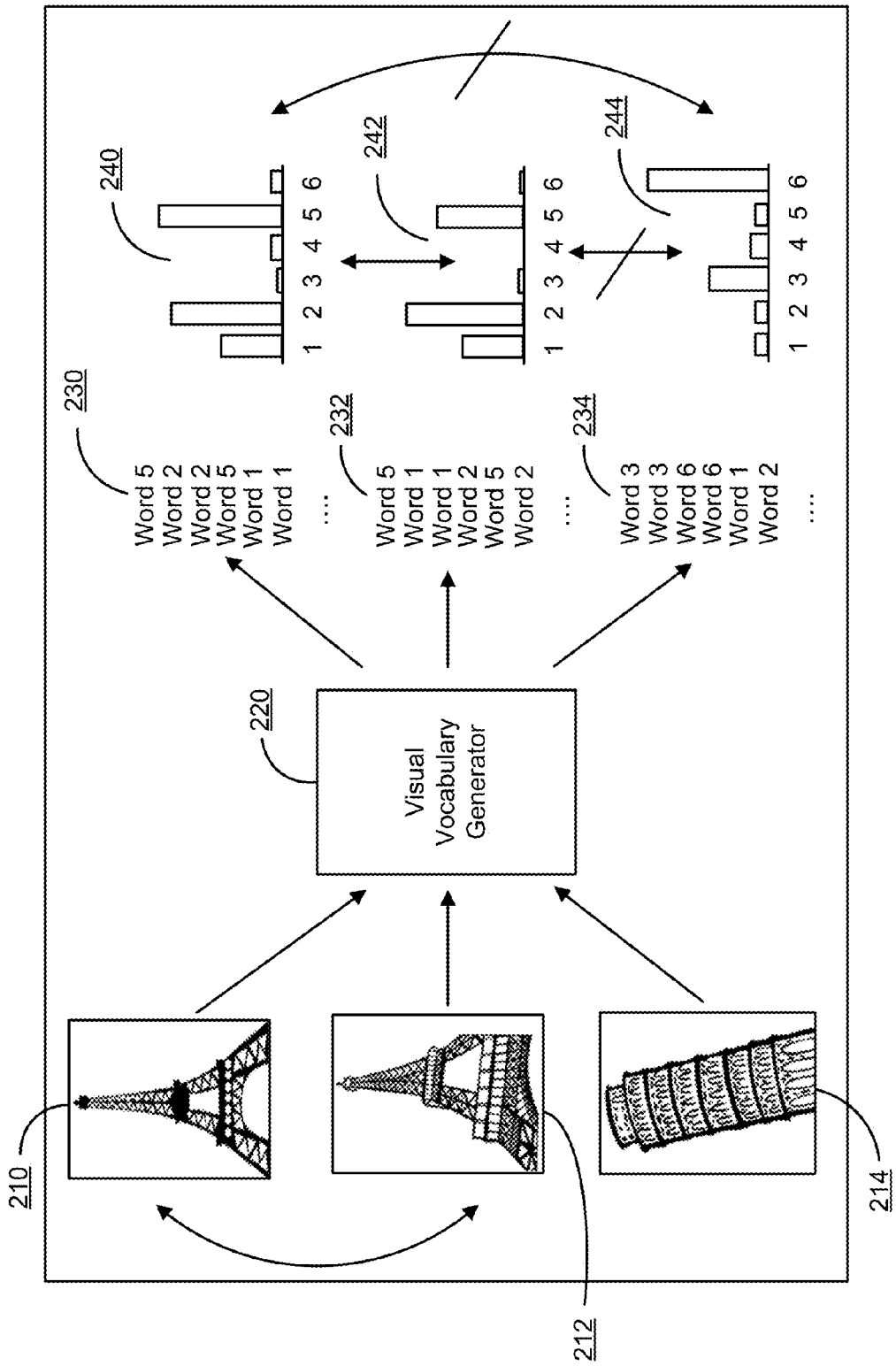
FIG. 2 is a block diagram that depicts digital images and multiple visual word histograms that reflect visual word frequencies, in an embodiment.

FIG. 2 is a block diagram that depicts digital images 210-214 and multiple visual word histograms 240-244 that reflect visual word frequencies, in an embodiment. Each of digitals images 210-214 are input to a visual vocabulary generator 220. For each digital image of images 210-214, the visual vocabulary generator 220 generates a list of visual words that are associated with the corresponding digital image. Thus, visual vocabulary generator 220 generates: (1) a list of visual words 230 for digital image 210; (2) a list of visual words 232 for digital image 212; and (3) a list of visual words 234 for digital image 214.

For each list of visual words 230-234, a visual word histogram is generated. Thus, visual word histogram 240 is generated based on list of visual words 230, visual word histogram 242 is generated based on list of visual words 232, and so forth. Although FIG. 2 depicts visual word histograms, embodiments of the invention are not required to generate a visual word histogram. The visual word histograms of FIG. 2 are merely visual indications of the relative word frequencies associated with different digital images.

Comparing visual word frequencies is significantly (e.g., an order of magnitude) faster than directly comparing feature descriptors from different digital images due to the fact that visual words are much smaller and less complex than their corresponding feature descriptors.

If two sets of visual word frequencies match, then the digital images that correspond to the visual word frequencies are considered a match. Two digital images that match each other are said to belong to the same "cluster." In response to a determination of a match, cluster data that indicates a set of digital images that match each other is stored. Cluster data may identify (a) a physical storage location of each digital image that belongs to a cluster and/or (b) a unique identifier (such as a file path and file name) that is associated (directly or indirectly) with a physical storage location.

At block 160, "rough" or estimated feature correspondences between digital images of the same cluster are established. In other words, one or more keypoints (in a first digital image of a cluster) that are associated with a particular visual word are mapped to, or correlated with, one or more keypoints (in a second digital image of the cluster) that are also associated with the visual word. As noted previously, feature descriptors (from different digital images) that map to the same visual word are likely, but not guaranteed, to be associated with the same point in space.

Figure 3A:
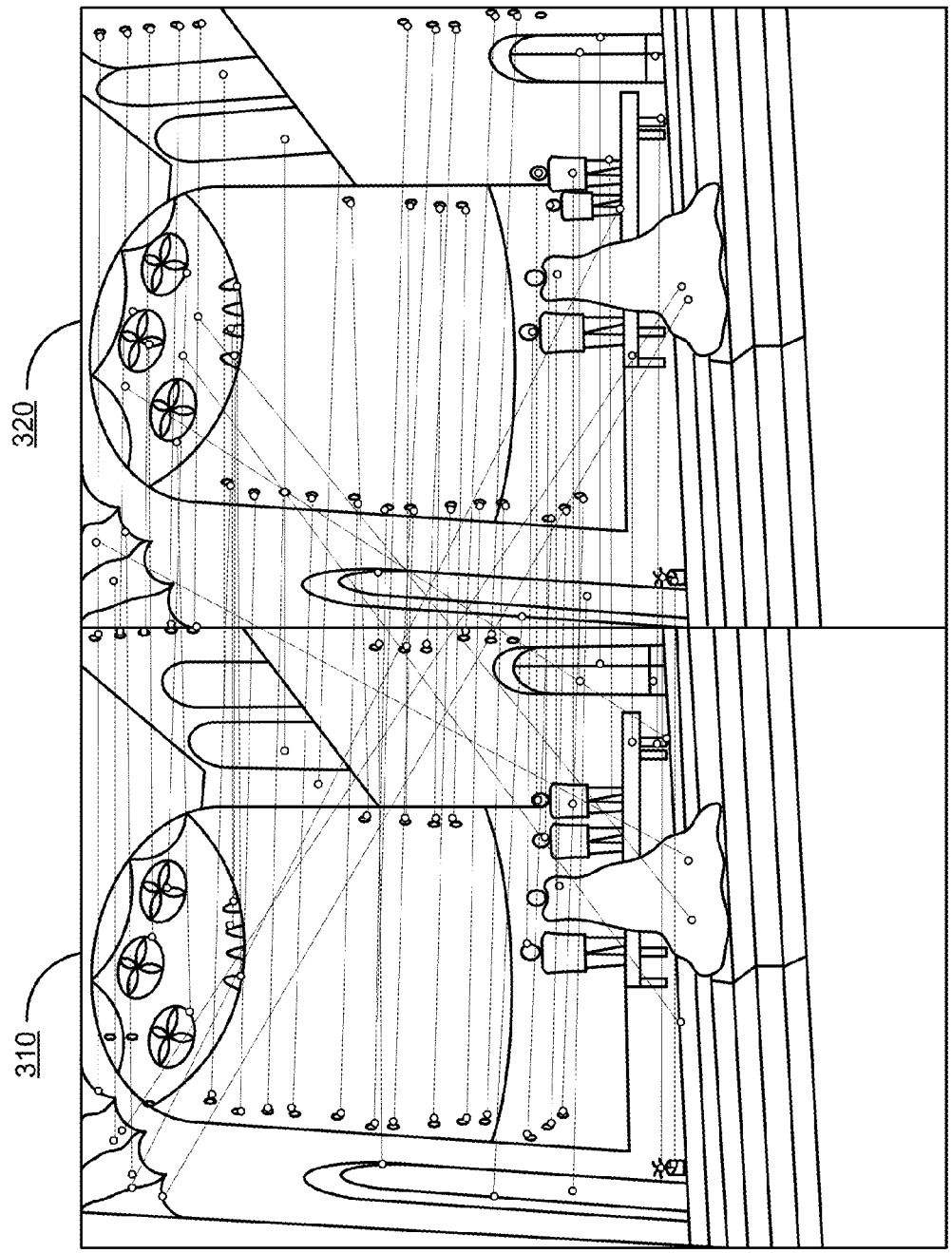
FIG. 3A is a block diagram that depicts two digital images and a set of feature correspondences between the two digital images that are based on visual word frequencies, in an embodiment.

FIG. 3A is a block diagram that depicts two digital images 310 and 320 side-by-side with lines that depict feature correspondences between the two digital images, in an embodiment. Some of the lines depicted in FIG. 3A connect points in the respective digital images that are clearly not of the same point or feature.

At block 170, feature correspondences are checked (and some are removed) for geometric consistency. This block is performed because it is likely that some keypoints (that are associated with the same visual word) in two different digital images are not really of the same point or feature.

The checking process may involve a fundamental matrix model. The fundamental matrix model is estimated from the rough matches using RANSAC or "RANdom SAmple Consensus." RANSAC is an iterative method to estimate parameters of a mathematical model from a set of observed data which contains outliers. RANSAC is a non-deterministic algorithm in that it produces a reasonable result only with a certain probability, with this probability increasing as more iterations are allowed. A basic assumption of RANSAC is that the data (correspondences between features) consists of "inliers" (i.e., data whose distribution can be explained by some set of model parameters) and "outliers" (i.e., data that do not fit the model). In addition to this, the data can be subject to noise. The outliers can come, for example, from extreme values of the noise or from erroneous measurements or incorrect hypotheses about the interpretation of data. RANSAC also assumes that, given a (usually small) set of inliers, there exists a procedure which can estimate the parameters of a model that optimally explains or fits this data.

Figure 3B:
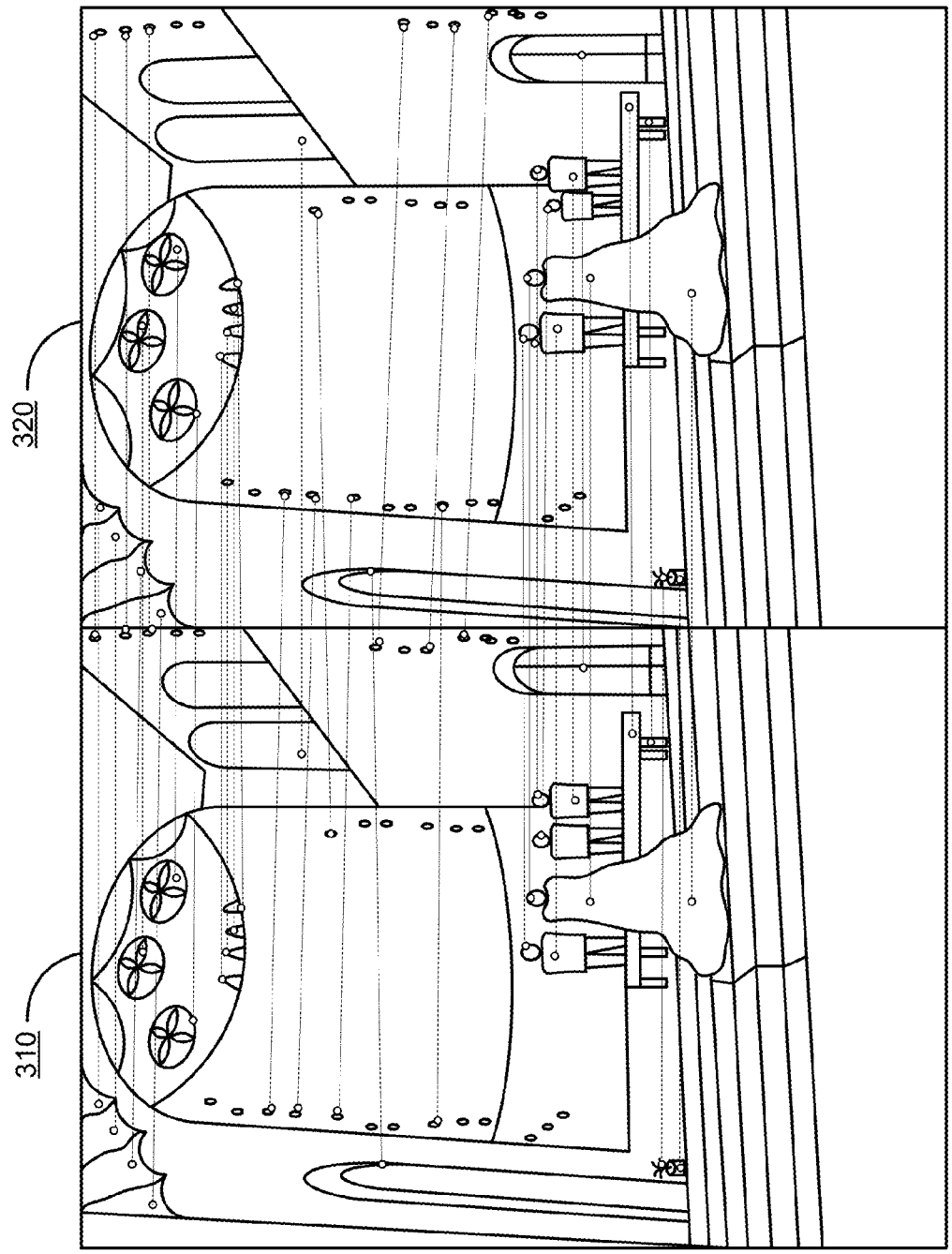
FIG. 3B is a block diagram that depicts the two digital images and a subset of the feature correspondences, in an embodiment.

FIG. 3B is a block diagram that depicts digital images 310 and 320 and lines that are depicted in FIG. 3A but that were not removed after checking the feature correspondences, in an embodiment. For example, RANSAC may have been applied to the feature correspondences depicted in FIG. 3A in order to identify a subset of the feature correspondences that are depicted in FIG. 3B.

By using visual words (instead of feature descriptors) as correspondences directly, processing speed significantly decreases by an order of magnitude (e.g., hours to minutes for a typical photo album). One trade-off using the visual words approach is loss in accuracy, such as false positives. For example, two digital images that do not match may have been determined to be matches. After RANSAC (or similar technique) is applied, incorrect matches between image pairs should be extremely rare.

In an embodiment, after a set of clusters are identified, full feature descriptors (as opposed to visual words) are used in a later refinement step that involves determining whether some digital images should really belong to the same cluster. The refinement step may be limited to only those matches that are below a particular match threshold.

2.4 Initialize SfM

Once a cluster of digital images is identified, 3D information is generated from the digital images in the cluster. Generating 3D information corresponds to blocks 180-195. Although not depicted, block 180 involves selecting a pair of digital images from a cluster. The pair of digital images may be selected based one or more criteria, such as being the closest match (in terms of visual words) relative to other possible pairs in the cluster or quality of the digital images relative to the quality of other digital images in the cluster.

At block 180, auto-calibration of camera parameters is performed to determine (1) internal or intrinsic camera parameters, such as focal length, optical center, and aspect ratio and (2) external or extrinsic parameters. Examples of approaches to perform camera calibration to determine the internal or intrinsic camera parameters include linear regression (least squares), non-linear optimization, vanishing points, multiple planar patterns, and panoramas (rotational motion).

Block 180 also involves computing external or extrinsic parameter(s), such as pose (or orientation) and position (as in 3D coordinates of camera center), based on the auto-calibration of internal camera parameters. At block 190, given camera poses and feature correspondences from the cluster identification step (i.e., block 150), 3D points are computed. This step may be referred to as triangulation. The result of the steps of block 180 that are performed on a pair of digital images in a cluster (once the cluster is identified) is an initial 3D point cloud, correct camera calibration, and poses for the pair of digital images.

2.5 Adding Digital Images

At block 195, the initial 3D structure and camera details are improved and additional camera positions added using an incremental approach. Such an incremental approach may be as follows: (1) process another digital image from the same cluster to which the initial pair of images belong, (2) optimize parameters again, and (3) update camera parameters and add new triangulated 3D points.

In an embodiment, selecting the next digital image in a cluster to process involves taking into account one or more selection criteria. The one or more selection criteria may be associated with the visual words associated each remaining digital image of the cluster (to which the initial pair of images also belong). For example, a remaining digital image in the cluster that contains the most reconstructed scene points is selected as the next digital image to process for 3D information. The 3D point cloud generated based on the initial pair of digital images may be used to identify points that are found in both images of the initial pair. The identified 3D points are used to identify a set of visual words associated with the points in one or both of the initial images. The identified set of visual words is compared to visual word frequencies of one or more remaining digital images in the cluster to identify a particular set of visual word frequencies that is most similar to the identified set of visual words. The digital image associated with the particular set of visual word frequencies is selected as the next digital image to process.

Adding digital images (regardless of how the next digital image is selected) improves the 3D point cloud (e.g., by increasing the cloud's density), the calibration, and the pose for all digital images in the cluster. Thus, the position of points that were previously added to the 3D point cloud and the calibration and pose associated with previously-processed digital images may be improved.

Figure 4A:
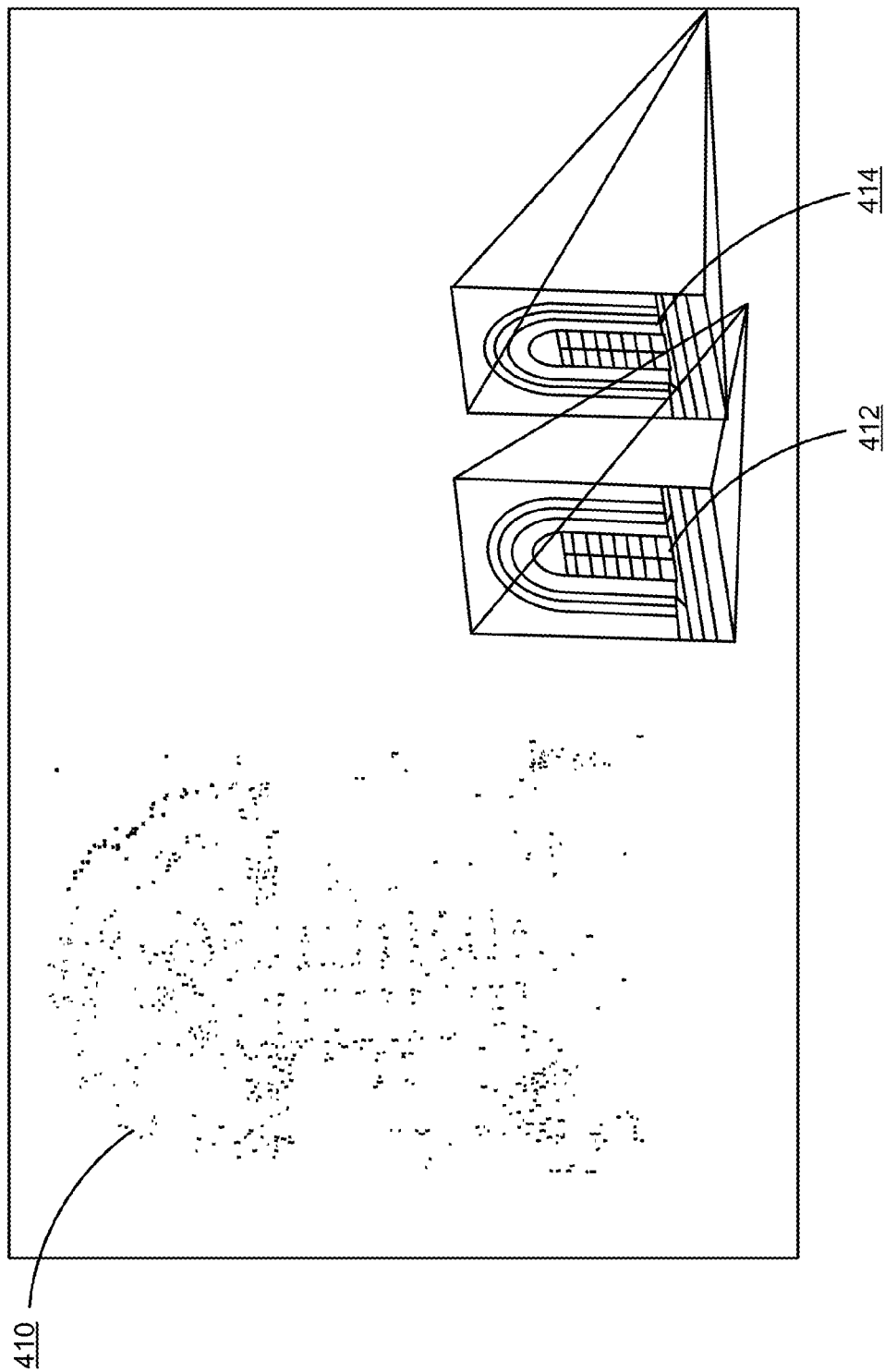
FIG. 4A is a block diagram that depicts a 3D point cloud and two digital images from which the 3D point cloud was generated, in an embodiment.

FIG. 4A is a block diagram that depicts a 3D point cloud 410 and digital images 412 and 414, in an embodiment. 3D point cloud 410 is generated based on digital images 412 and 424 and is a result of blocks 180 and 190.

Figure 4B:
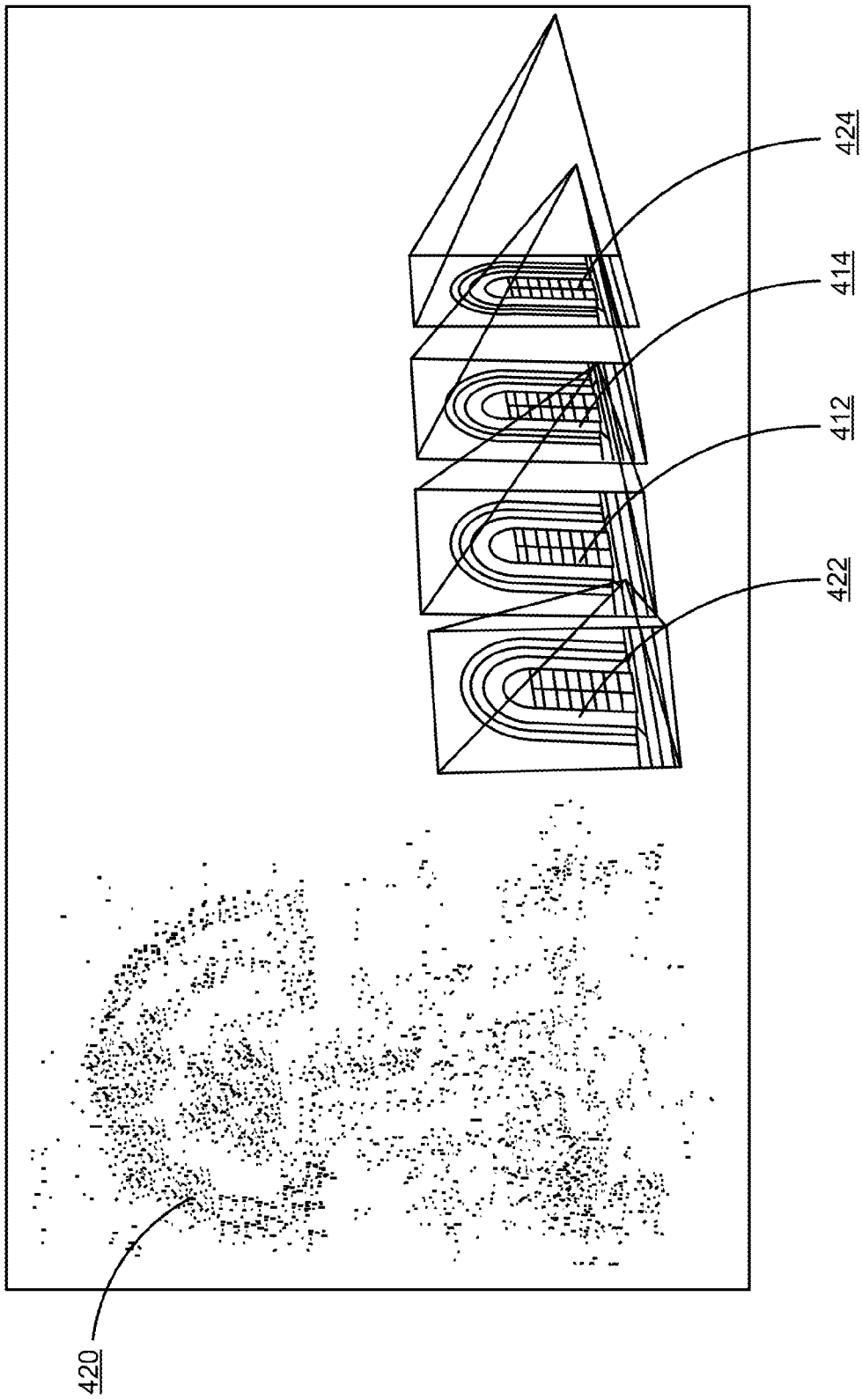
FIG. 4B is a block diagram that depicts a view of a 3D cloud and additional digital images from which the 3D point cloud was generated, in an embodiment.

FIG. 4B is a block diagram that depicts a view of a 3D point cloud 420 and digital images 412, 414, 422, and 424, in an embodiment. 3D point cloud 420 includes points depicted in 3D point cloud 410 along with points that are calculated based digital images 422 and 424. 3D point cloud 420 is a result of block 195.

2.6 Storing Data

The data that results from the computations described previously is stored. In an embodiment, one or more of the following types of data is stored: (1) visual word frequencies for each digital image; (2) a camera matrix for each digital image; (3) 3D point coordinates and their corresponding 2D coordinates for each identified cluster; and (4) a visual word ID for each keypoint. A camera matrix is a 3×4 matrix that describes the mapping of a camera from 3D points in 3D space to 2D points in a (2D) digital image.

Also, the full feature descriptors for certain relevant digital images may be stored. "Relevant" digital images may be those that belong to clusters and/or ones that have the most in common with each other digital image in a cluster. Additionally, dominant or important scene planes or structures may be stored for one or more digital images of a cluster.

The foregoing data may be stored in addition to other data available from the digital images, such as GPS information, compass information, camera settings and parameters, the time and date, etc.

The 3D information, including camera positions and poses, are usually obtained in an arbitrary local coordinate system. Using other camera data or data from known 3D map models (such as Apple Maps in iOS6), the camera positions can be registered to a real-world coordinate system. In this case, the 3D information may improve geo-localization of the digital images beyond the accuracy of GPS systems.

3.0 User Interface Capabilities

Once 3D information about an object reflected in a set of digital images is identified, that 3D information may be leveraged to provide a unique user experience in one or more ways. Specifically, 3D information for a cluster of digital images is used to display the multiple images of a cluster on a computer display. The 3D information may be generated using the techniques described above or using other techniques not described herein. Further, the 3D information for a cluster may have been generated on the same device (and by the same software application suite) that uses the 3D information to provide the unique user experience.

3.1 Cluster Association Data

In an embodiment, once clusters or groups of digital images are identified, the data that is used to associate digital images with certain clusters is referred to as "cluster association data." Cluster association data may be the same as or based on the cluster data described previously. In order to display a stack of digital images, cluster association data is read to identify, for at least one cluster, one or more digital images that are associated with a cluster identifier of the one cluster.

Cluster association data may be stored as part of the digital image data of a digital image. For example, cluster association data for a particular digital image may be stored in the same file as the digital image data of the particular digital image. In this example, cluster association data for a particular digital image may identify one or more other digital images that belong to the same cluster.

Alternatively, cluster association data may be stored separate from the digital images. For example, cluster association data includes a mapping between a cluster identifier and an image identifier for each of one or more digital images.

Alternatively, a digital image (or a file that contains digital image data) may include a cluster identifier that is used to lookup information that is stored separately from the digital image. Such information may map cluster identifiers to image identifiers.

Regardless of how cluster association data is stored, an image identifier of a digital image may be a physical storage location or a logical storage location that, when processed, is translated into a physical storage location in order to read the digital image from storage, whether volatile or non-volatile.

3.2 Stacks

A stack is a set of digital images (ordered or un-ordered) that may be visually represented, in a contracted state, using a representative image (referred to as a "pick image"), and in an expanded state in which all digital images associated with the stack are displayed rather than just the pick image. The pick image of the stack, which is displayed on a display, may be used to represent each digital image of the stack, thereby reducing the number of digital images displayed on the display. Actual digital images may be graphically represented by small likenesses, called "thumbnail" images. The term "image" shall be construed to mean one of a large image, its representative thumbnail, or both.

A user, such as a photographer, may use a stack to represent multiple digital images on a display by displaying only the pick image. The user may change the state of the stack to display all digital images associated with the stack if the user desires to view all of the images of the stack, rather than just the pick image. Stacks allow a user to organize and manage large amounts of digital images by visually representing multiple digital images by displaying just the pick image, thereby promoting organization and minimizing the amount of visual information needed to be displayed on the screen to identify each digital image of the stack to the user.

There are different approaches for organizing digital images into stacks. One approach involves determining a time in which the digital image was captured by a digital camera and assigning digital images that were captured during a particular time period to a stack for that time period. For example, all digital images taken on Dec. 1, 2012 are considered to belong to one stack while all digital images taken on Dec. 2, 2012 are considered to belong to another stack. Another approach for determining how to organize digital images into stacks involves determining a location in which the digital images were taken. For example, digital images taken in San Francisco may be organized into one stack while digital images taken in Los Angeles may be organized into another stack.

3.2.1 Stacks Based on Matching Features

However, in an embodiment, a stack corresponds to a group that is determined based on features detected in multiple digital images. If multiple digital images are determined to contain the same feature(s), then those digital images are considered to belong to the same group or cluster, and thus the same stack. For example, if it is determined that two digital images each have the same building depicted therein, then information is stored that identifies the two digital images as belonging to the same stack.

FIG. 5 is a flow diagram that depicts a process 500 for aligning images in a stack, in an embodiment. Process 500 may be implemented by a photo management application.

At block 510, a first image that includes a first image region and a second image that includes a second image region that corresponds to the first image region are identified. The first and second image regions may have been detected by one or more software components (such as an object detection and recognition application) that are different than the entity that implements process 500. The first and second image regions may have been identified based on 2D information or 3D information. In the latter scenario, the techniques described previously may have been used to generate the 3D information, from which the first and second image regions are determined.

At block 520, the first image and at least a first portion of the second image are concurrently displayed such that the first image region is aligned with the second image region and at least a second portion of the second image is obstructed by the first image. In other words, the first image at least partially overlaps the second image.

As noted previously, embodiments are not limited to how features are identified or how features from different digital images are compared to determine that two digital images contain the same feature(s) or object(s). Thus, 3D information is not required in this embodiment. In other words, only blocks 110-170 (and not blocks 180-195) described previously may be used to identify, in multiple digital images, features that match.

Also, a single digital image may be associated with multiple groups or clusters. Thus, a single digital image may belong to multiple stacks.

3.2.2 Aligning Digital Images in a Stack

FIG. 6 is a diagram that depicts example stacks 610-630, in an embodiment. In some approaches for displaying a stack, only the pick image is visible. The fact that the stack includes additional digital images may be indicated visually by edges of other digital images appearing at one side of the pick image. In such an approach, the edges do not include data from the other digital images. However, in the depicted embodiment, image portions from non-pick images are displayed.

In an embodiment (and as depicted in FIG. 6), digital images in a stack are aligned based on features that detected in each digital image of the stack. Because an object reflected in multiple digital images is unlikely to be located in the same relative area of the view of each digital image and the digital images are aligned based on the object, the edges of each digital image are not likely to be aligned. This is true even if each digital image in a stack had the same dimensions.

In a related embodiment, digital images in a stack are aligned based on a region that is common to each digital image in the stack. The region reflected in a first digital image may be in one corner of the first digital image while the region reflected in a second digital image may be in an opposite corner of the second digital image. Therefore, aligning both digital images based on the region will result in the edges of the first and second digital images not being aligned. The region may be a planar region or any other type of region.

3.2.3 Transformations

Aligning digital images of a stack based on a set of features detected in the digital images may result in undesirable effects, such as digital images whose edges are not perfectly horizontal or vertical or digital images where a set of features in one digital image is significantly smaller than a set of features in another digital image. For example, some photos are taken while a camera is angled upward while other photos are taken while the camera is angled downward. Similarly, photos of an object may be taken from many different angles. As another example, some photos of an object may be taken relatively close to the object while other photos of the object may be taken relatively far away from the object.

Thus, in an embodiment, one or more transformations are performed on one or more digital images in a stack in order to align a set of features of one digital image with a matching set of features of another digital image. Examples of transformations include scaling, rotating, and translating. Scaling involves increasing or decreasing the dimensions of a digital image. Rotating involves moving a digital image about the x-axis in 3D space, such that the digital image appears rotated clockwise or counterclockwise. Translating involves moving a digital image on a 2D plane without scaling or rotating.

In an embodiment, a user of a digital image management application is presented with multiple options in determining how a stack of digital images is to be displayed. Each option corresponds to a different set of one or more transformations that are performed on one or more digital images of a stack. The different set of one or more transformations may include: (1) scaling, rotating, translating; (2) just scaling and translating; and (3) just translating.

Although option (1) provides the most accurate result when displaying a stack, option (2) may be more visually appealing since non-rotating options ensure that edges of digital images in a stack remain horizontal or vertical. If a digital image in a stack is rotated even slighting, the "top" and "bottom" edges will not be horizontal and the side edges will not be vertical. Displaying a rotated digital image (whether a pick or non-pick image) in a stack may make it difficult for a user to select that digital image.

In a related embodiment, a photo management application implements one or more of the set of transformations without allowing a user to select which set of transformations is to be implemented.

3.2.4 Pick Image in a Feature-Aligned Stack

In an embodiment, the pick image of a stack is displayed while being entirely or substantially opaque. Other (non-pick) digital images of the stack are displayed with a certain level of translucency, such as 50%, or at varying degrees of translucency or transparency. This difference in opacity allows the user to determine which digital image is the pick image is which digital images are not.

In an embodiment, one or more criteria are used to determine which digital image in a stack is to be displayed as the pick image. Example of such criteria include time, camera position, or size of a matching featuring. For example, the "oldest" digital image in a stack is selected as the pick image. As another example, the camera position associated with each digital image in a stack is used to select the pick image. The camera position may be determined using the 3D modeling technique described herein. The original determination of the camera position using 3D information may be performed by the digital image management application that causes the stack to be displayed or may be performed by an entity that is different than the digital image management application.

The camera position of each digital image in a stack may be used to determine which digital image is the left-most (i.e., on the y-axis in 3D space) digital image in the stack, the right-most digital image, and/or the "middle" digital image. The "middle" digital image may be the digital image in the stack that has a number of digital images to the "left" (i.e., on the y-axis in 3D space) of the digital image equal (or near equal) to the number of digital images to the "right" (i.e., on the y-axis in 3D space) of the middle digital image. Instead of the y-axis, one or more of the other axes (i.e., the x-axis and z-axis in 3D space) may be used to determine the pick digital image in a stack and/or how the digital images are ordered.

In an embodiment, multiple criteria may be used to order digital images in a stack. For example, one criterion may be time and another criterion may be camera position. As another example, one criterion may be camera position and another criterion may be camera pose (or orientation). Both pose and position may be determined using the SfM technique described herein (or a variation thereof). In a likely real world example, a person may take a first set of photos of an object or scene from a first location and then move a few steps and take a second set of photos of the object or scene from a second location. In this example, camera position may be used to order the resulting digital images such that the first set of photos are ordered before the second set of photos. Any axis in 3D space may be used to order each digital image. Then, the pose or orientation of each digital image may be used to order the first set of photos and the second set of photos.

In an embodiment, if a user selects a different (i.e., non-pick) digital image in the stack, then that digital image becomes the pick image. As a result, the selected digital image becomes entirely (or substantially) opaque and the previous pick image becomes translucent, similar to any other digital images that might be in the same stack. Thus, portions of the previous pick image may still be visible and selectable.

3.2.5 Scrubbing

In addition to or alternative to navigating a stack by selecting (e.g., clicking on) individual digital images, a stack may be navigated by "scrubbing" with a mouse or touch device over the stack, causing non-pick images to be displayed as pick images. In other words, different digital images in the stack may be displayed as the pick image at different times (in a relatively short period of time, for example) without the user having to individually select any particular digital image in the stack. User input may involve a user's finger moving in a horizontal or vertical direction across a touch screen on smartphone or tablet. The user's finger may be required to traverse one or more digital images in the stack or the input may be somewhere else on the touch screen. Alternatively, user input may involve a user selecting a stack (e.g., via a keyboard or cursor), depressing a button on a mouse, and, while keeping the button depressed, moving a cursor horizontally or vertically across a display. Alternatively, user input may involve selecting a stack and, while the stack is selected, selecting a key on a keyboard and holding down an arrow key, whether a left, right, up, or down arrow key.

The order in which the pick image is determined while a user is scrubbing a stack may depend on the direction of the scrubbing and 3D information associated with the digital images in the stack. For example, if a user is moving her finger (or a cursor) across a stack from left to right, then digital images associated with the left-most camera positions (relative to the camera positions of other digital images in the stack) are displayed first. If the user is moving her finger across the stack from right to left, then digital images associated with the right-most camera positions (relative to the camera positions of other digital images in the stack) are displayed first. As another example, if a user is moving her finger (or a cursor) across a stack from top to bottom, then digital images associated with camera poses that are most angled downward (relative to the camera poses of other digital images in the stack) are displayed first.

3.2.6 View Mode

In an embodiment, because a stack may include just thumbnail versions of multiple digital images, when a pick image of a stack is displayed, a larger version of the pick image is displayed on another portion of a display on which the stack is/was displayed. The display mode where a larger version of a pick image is displayed is referred to herein as "full view mode." The display mode where a larger version of the pick image is not displayed is referred to as "stack view mode." While in full view mode, the stack (or a portion thereof) may be displayed concurrently with the selected digital image. Full view mode may be changed to the stack view mode based on one or more inputs, such as the user selecting the larger version of the pick image, re-selecting the pick image in the stack, selecting the stack, selecting one or more keys on a keyboard, or providing one or more voice commands.

In related embodiment, full view mode is entered only after a user selects the pick image in the stack. Also, a larger version of a non-pick image may be displayed if a user selects the non-pick image in a stack.

In an embodiment, if a user selects a digital image in a first stack and the digital image also belongs to a second stack, then the second stack is combined with the first stack. Determining whether a digital image belongs to multiple stacks may be determined by analyzing cluster association data associated with a digital image whenever a digital image is selected. (As noted previously, cluster association data may be stored with a digital image and/or may be stored separately from digital images.) The digital images of the second stack are aligned based on the same criteria on which the digital images in the first stack are aligned. In this way, the first stack may grow, or increase in number. Also, when combining two stacks, one or more criteria of each digital image in both stacks may be analyzed to determine how to order the digital images of the two stacks. For example, the camera position (or time) of each digital image in each stack is identified and used to order the digital images of both stacks.

3.3 Navigation

In an embodiment, navigation within a digital image management application is enabled using 3D information. A cluster of digital images managed by the image management application may be navigated while in "non-stack" form, such that there is little, if any, overlap of one digital image (or thumbnail thereof) by another digital image (or thumbnail thereof) in the cluster. In "non-stack" form, digital images of a cluster are not aligned on top of each other based on a set of features identified in each digital image. However, digital images are displayed and organized on a display based on one or more 3D attributes of the digital images, such as camera position and/or camera pose.

Figure 7:
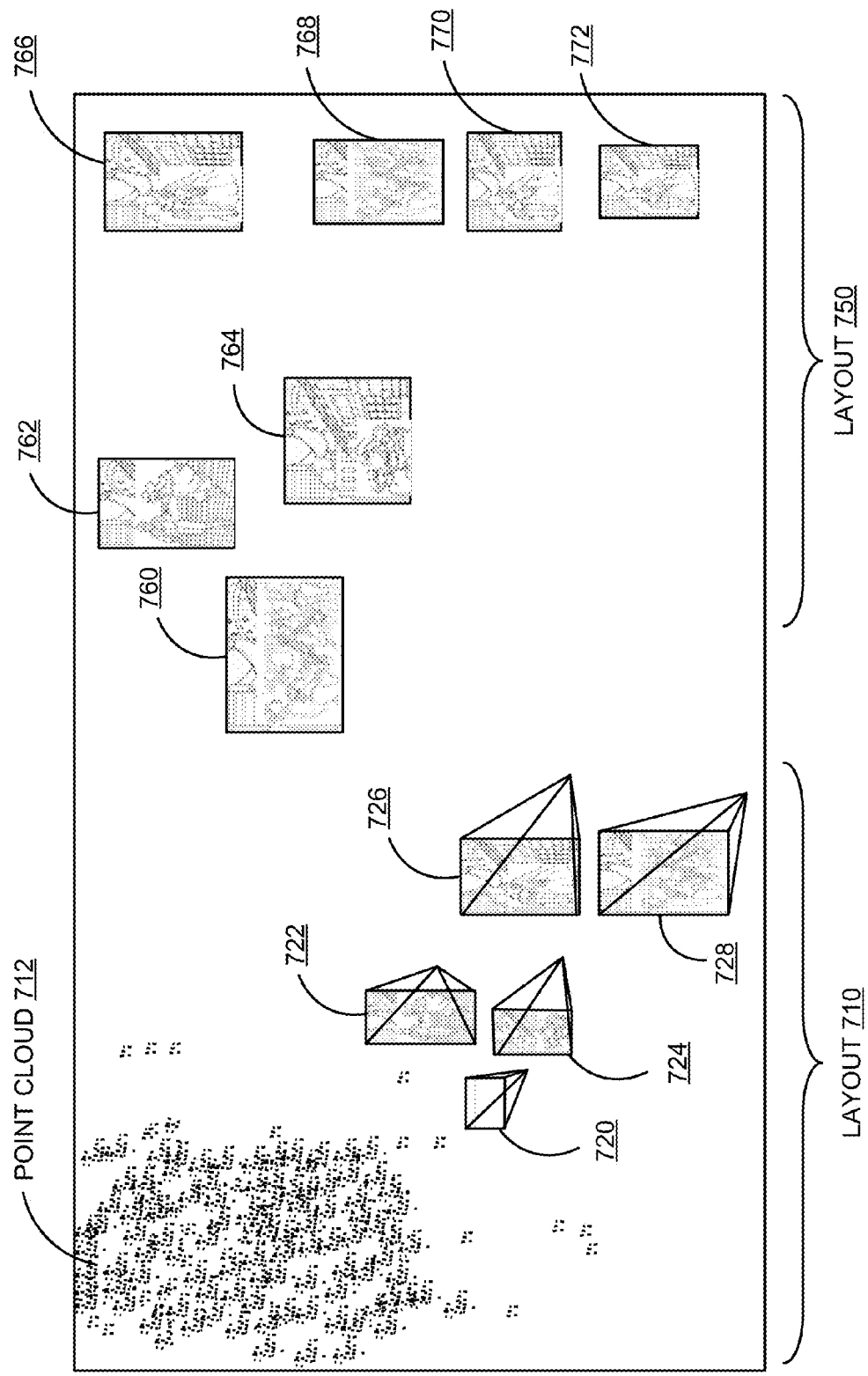
FIG. 7 is a diagram that depicts a 3D layout of digital images in a cluster and a 2D layout of digital images in a cluster, in an embodiment.

FIG. 7 is a diagram that depicts a 3D layout 710 and a 2D or flat layout 750, in an embodiment. Each layout is of a cluster of digital images. In the depicted embodiment, digital images in 3D layout 710 are a subset of the digital images in 2D layout 750. A cluster may be identified based on the SfM technique described herein. Alternatively, a cluster is identified based on another automatic technique or based on user input.

In an embodiment, one or both of layouts 710 and 750 is displayed in response to input that is received relative to a stack of digital images, such as stack 620. For example, a user "double clicks" (e.g., using a mouse and cursor) on stack 520, which causes layout 750 to be displayed. As another example, a user selects stack 520 and then selects a menu option or a set of one or more keys on a keyboard, which causes layout 750 to be displayed. As another example, a user "right clicks" on any digital image in stack 620, which causes a list of options from which the user may select. One of the options in the list may be a 3D layout option and/or a 2D layout option. Selection of one of those options causes the corresponding layout to be displayed.

In a related embodiment, one or both of layouts 710 and 750 is displayed without first displaying a stack of digital images. For example, a user may select a menu option (e.g., View→Format→2D Layout) provided by the digital image management application that causes a cluster of images to be displayed in either the 3D or 2D layout. The digital image management application may include a navigation pane or separate window that lists or identifies one or more clusters of images without displaying digital images from any of the clusters. Each cluster may be named, dated, or otherwise distinguished from any other clusters in the list. Selection of an identified cluster may cause one or both of layouts 710 or 750 to be displayed.

3.3.1 3D Layout 3D layout 710 includes a 3D point cloud 712 and digital images 720-730. Digital images 720-730 include perspective lines that each indicates a line from the projected camera position and a corner of a digital image. If too many photos were taken at a particular location, then one or more digital images that are associated with that location may be identified and excluded so as to allow a user to view digital images that are not obstructed by any other digital image.

The elements in 3D layout 710 may be viewed in a number of different ways, including zooming, rotating, and panning. Rotating elements in 3D layout 710 may involve rotating point cloud 712 and digital images 720-730 about a center point. The center point may be at the center of point cloud 712 or at any other point in 3D space depicted in 3D layout 710. The center point may be automatically determined by the digital image management application or may be identified based on input from a user. Rotating the visual elements in 3D layout 710 about the center point means that the distance from the center point to the "view point" remains constant. The "view point" is a point at which an imaginary camera, through which the user is viewing the elements in layout 710, is positioned in 3D space. A visual effect of rotating is that visual elements further away from the center point appear to move faster relative to visual elements near the center point.

Panning the visual elements in 3D layout 710 involves changing the view point without changing pose or orientation of the current view. Panning has a visual effect of maintaining the orientation of the view of the elements in 3D layout 710 while moving the view point on a vertical plane.

Zooming in on visual elements in 3D layout 710 involves moving the view point in the direction of the current orientation of the current view without changing the pose or orientation of the current view.

3.3.2 2D Layout

Figure 8:
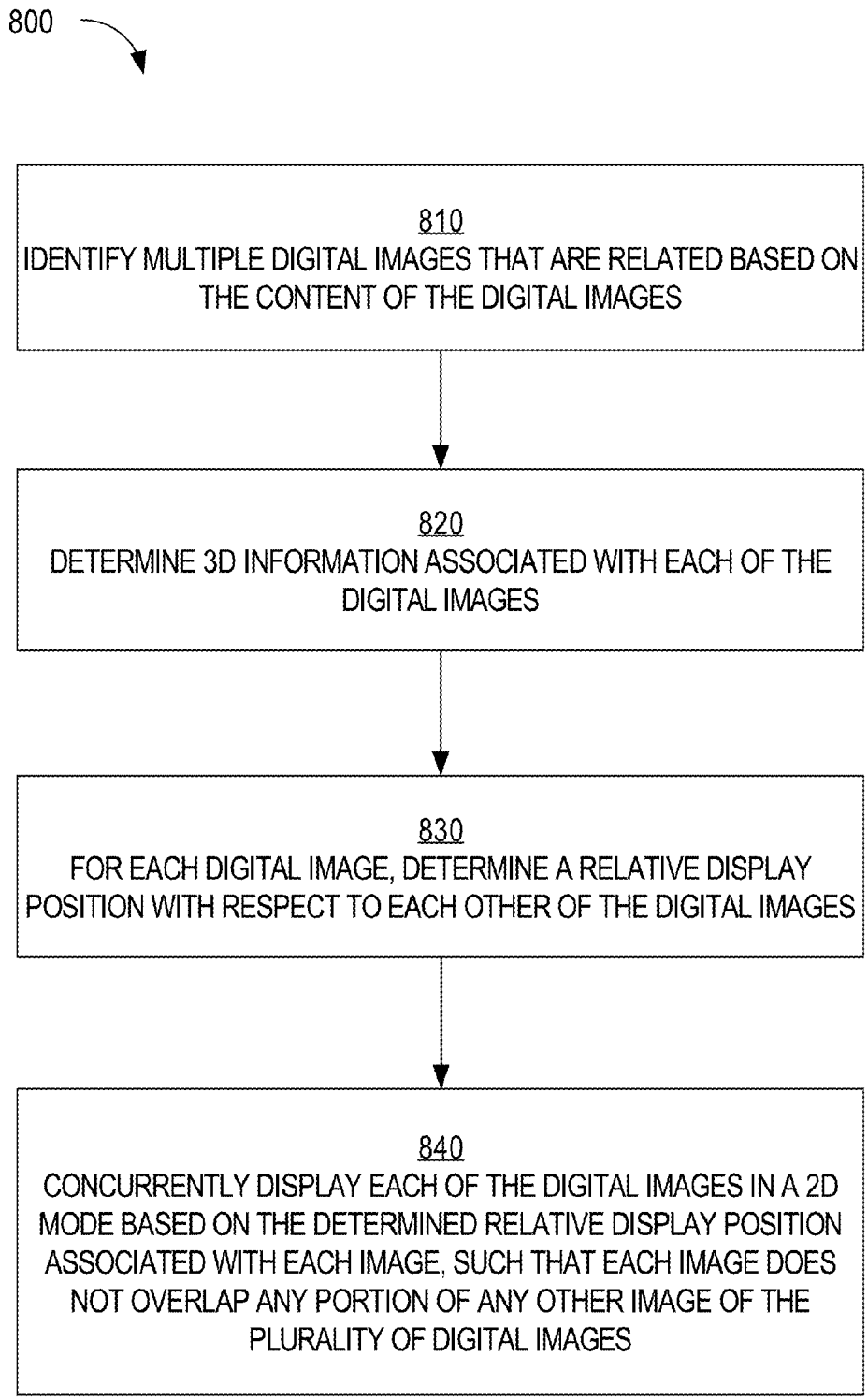
FIG. 8 is a flow diagram that depicts a process for displaying images from a group in a 2D layout, in an embodiment.

FIG. 8 is a flow diagram that depicts a process 800 for displaying images from a single group in a 2D layout, in an embodiment. Process 800 may be implemented by a photo management application that executes on a computing device, such as a laptop computer or a tablet computer.

At block 810, a plurality of digital images are identified where the plurality of digital images are related to each other based on the content of each digital image. Each image includes one or more features that are in common with one or more features in each other image of the plurality of digital images.

At block 820, 3D information associated with each image of the plurality of digital images is determined. 3D information may include camera pose and/or camera position. The 3D information may have been generated prior to block 810 or after block 810. The 3D information may have been generated by the entity that implements process 800 (e.g., a photo management application) or by an entity (e.g., software application) that is different than the entity that implements process 800.

At block 830, based on the 3D information associated with each image of the plurality of digital images, a relative display position of the image with respect to each other image is determined.

At block 840, the plurality of digital images are displayed concurrently in a 2D mode based on the relative display position associated with each of the images, such that each image does not overlap any portion of any other image of the plurality of digital images.

Returning to FIG. 7, 2D layout 750 is an example layout that is generated based on process 800 and digital images 760-772, which are part of a group or cluster of images. While digital images 760-772 are displayed in 2D layout 750, the photo management application is said to be in "2D layout mode." If digital images are displayed as in 3D layout 710, then the photo management application is said to be in "3D layout mode."

Digital images 760-772 are organized on a display based on one or more criteria. The one or more criteria may include camera position and/or camera pose (or orientation). For example, the digital image management application identifies a camera position of each of digital images 760-772. The digital image management application causes digital images 760-772 to be displayed from left to right based on an order that indicates the relative horizontal position of each of digital images 760-772 such that, for example, the digital image with the left-most camera position is displayed to the left of each other image in the cluster.

In the depicted example, digital image 764 is displayed as a "center" image in layout 750, while each other digital image in the cluster is displayed either to the left or right of digital image 764. Digital images 760 and 762 may have camera positions that are to the left (on a horizontal axis in 3D space) of the camera position associated with digital image 764. Conversely, digital images 766-772 may have camera positions that are to the right (on a horizontal axis in 3D space) of the camera position of digital image 764.

The determination of where to display digital images 760-772 relative to each other may also be based on one or more criteria, such as time, camera pose, or camera position. For example, digital image 762 may be displayed above digital image 760 based on digital image 762 having a camera pose that is angled higher relative to the camera pose of digital image 760. As another example, digital image 762 may be displayed above digital image 760 based on digital image 762 having a camera position that is to the left of the camera position of digital image 760.

In an embodiment, the center image in 2D layout 750 is displayed larger than other digital images in 2D layout 750. For example, digital image 764 may be scaled 130% relative to other digital images in 2D layout 750.

In a related embodiment, if a user selects a "non-center" image (e.g., digital image 760), then the selected image becomes the new center image and the previous center image appears on the periphery of layout 750. A visual effect of this change may be causing the newly selected digital image to move from its current position to the center of layout 750. Also, the previous center image may be visually moved to the outside based on that image's camera position and/or pose, etc.

Alternatively, user selection of a non-center image may not result in the non-center image changing its position on the display. Instead, all the digital images around the selected digital image change display positions (e.g., by visually moving). Again, the new or updated display positions of the non-selected digital images are based on information associated with the digital images, such as camera position, camera pose, and/or time.

3.4 Slideshow Effects

Figure 9:
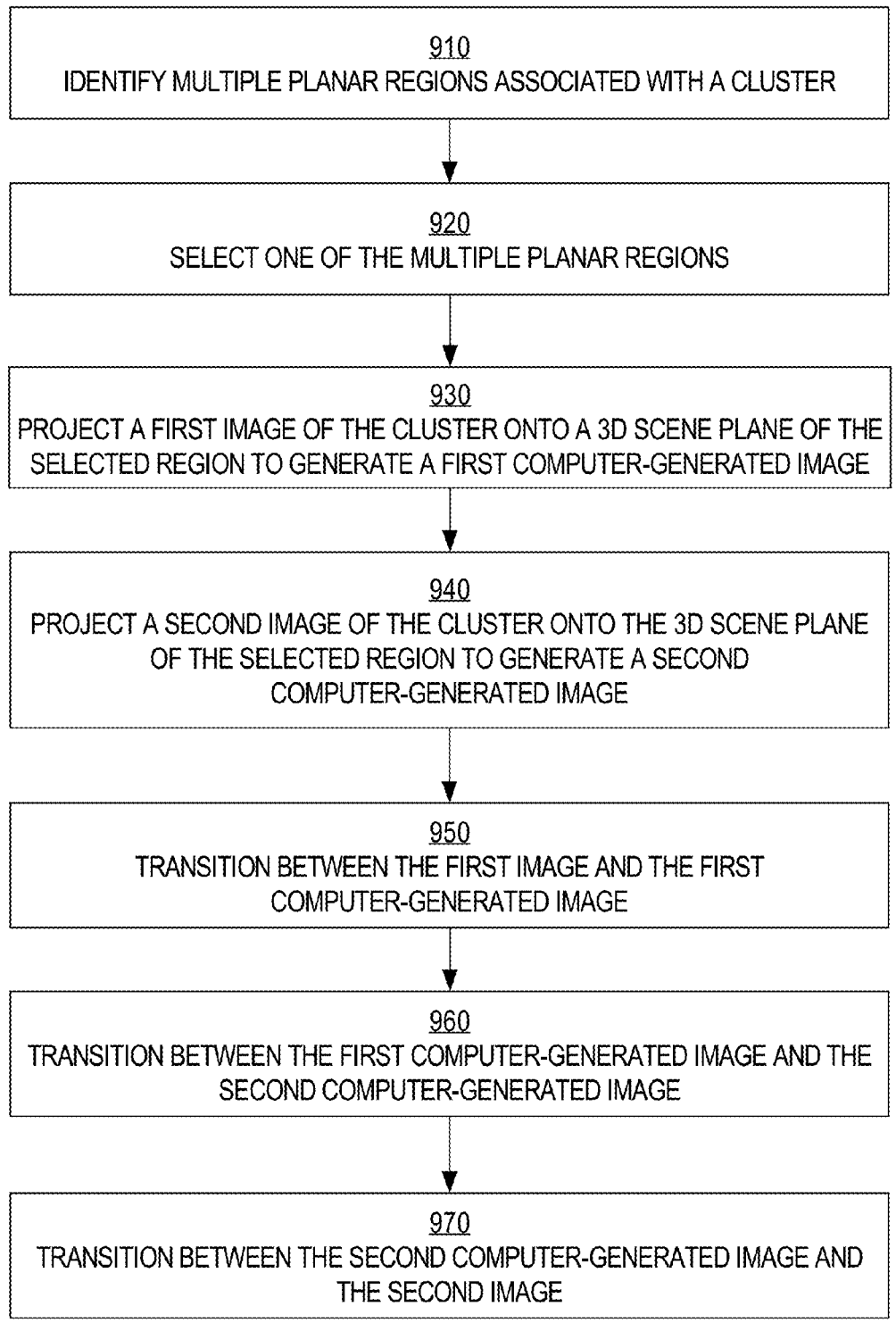
FIG. 9 is a flow diagram that depicts a process for transitioning between two digital images, in an embodiment.

In an embodiment, 3D information of at least two digital images of a cluster is used to create a visual transition between the two digital images. FIG. 9 is a flow diagram that depicts a process 900 for transitioning between two digital images, in an embodiment. Process 900 may be implemented by a digital image management application. Process 900 may be performed automatically once a cluster is identified. Alternatively, process 900 may be performed in response to user selection of two digital images in a cluster and user selection of an option to create a transition between the two digital images.

Process 900 includes preliminary steps (in blocks 910-940) that do not involve displaying images and transition steps (in blocks 950-970) that involve displaying images.

At block 910, one or more planar (or near planar) regions in a cluster are identified. Planar regions are identified based on the 3D points (which may be displayed in a 3D point cloud) that are calculated using a SfM technique or process 100 described herein. Because 3D modeling techniques that utilize 2D images is not guaranteed to produce a flawless 3D representation, it is not guaranteed that perfectly planar regions exist in the 3D representation. Therefore, one or more of the identified planar regions may be approximations.

Figure 10:
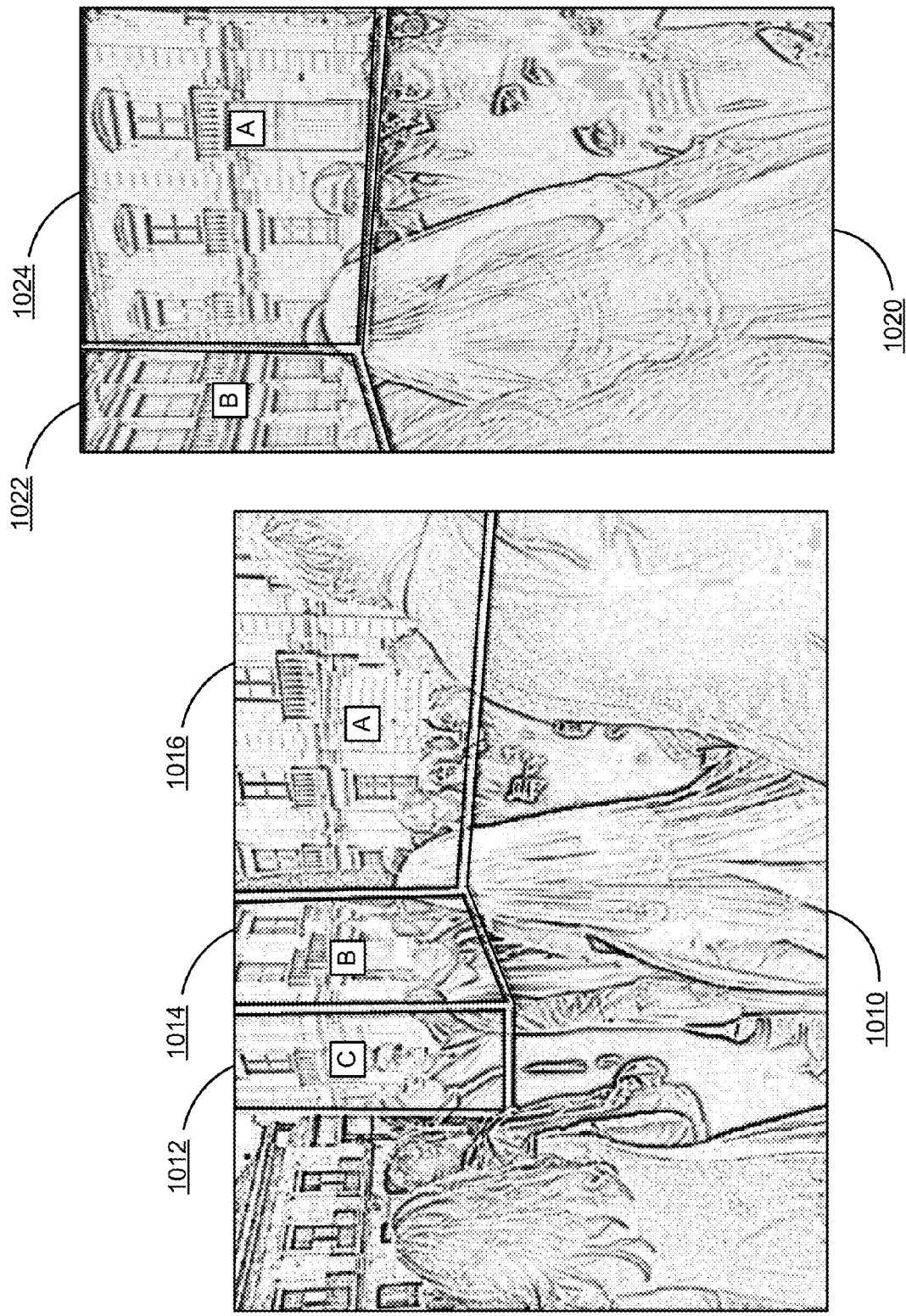
FIG. 10 is a block diagram that depicts two digital images that share common planar regions, in an embodiment.

FIG. 10 is a diagram that depicts digital images 1010 and 1020 that share one or more common planar regions, in an embodiment. Digital image 1010 includes plane 1012, plane 1014, and plane 1016 while digital image 1020 includes plane 1022 and plane 1024. Plane 1014 of digital image 1010 corresponds to plane 1022 of digital image 1020. Similarly, plane 1016 of digital image 1010 corresponds to plane 1024 of digital image 1020.

Also, one or more planar regions may not reflect actual planes in any of the digital images of a cluster. For example, block 910 may involve computing a planar region that is based on planes 1012-1016 in digital image 1010 of FIG. 10. The planar region may extend, for example, from the left edge of plane 1012 to the right edge of plane 1016. As another example, a least squares computation is made based on planes 1012-1016.

At block 920, one of the multiple planar regions is selected based on one or more criteria. Examples of such criteria include the largest region and camera pose or orientation of the planar region. For example, the largest of the identified planar regions may be selected. As another example, a planar region that is closest to being perpendicular to one or both of the camera poses or orientations associated with the two digital images may be selected.

The selection of a planar region may be performed automatically or in response to user input. For example, multiple planar regions may be identified in one or more both digital images that are to be a part of a transition and then the multiple planar regions are shown or displayed to a user to allow the user to select one of the planar regions. In an embodiment, if only one planar region is identified in two digital images that are to be part of a transition, then the planar region is selected automatically without allowing the user to select the planar region.

At block 930, one of the two digital images (referred to hereinafter as the "first digital image") is projected onto the identified planar region using reverse camera projection computed from a camera matrix. Any projection technique may be used to project the first digital image onto the identified planar region. Embodiments of the invention are not limited to any particular technique. The first digital image may have been selected based on user input. A user may have designated or identified the first digital image as being the "transition-from" image. The result of this projection is referred to hereinafter as the "first computer-generated image."

At block 940, the other of the two digital images (referred to hereinafter as the "second digital image") is projected onto the identified planar region, similar to block 930. The result of this projection is referred to hereinafter as the "second computer-generated image."

At block 950, a first transition is performed between (1) the first digital image and (2) the first computer-generated image. A visual effect of this transition is an impression of moving to 3D and "zooming in" on the common scene plane or planar region. The first transition may involve a blend or a crossfade between the first digital image and the first computer-generated image.

At block 960, a second transition is performed between (1) the first computer-generated image and a (2) the second computer-generated image. Similarly, the second transition may involve a blend or a crossfade between the first computer-generated image and the second computer-generated image.

At block 970, a third transition is performed between (1) the second computer-generated image and (2) the second digital image. A visual effect of this transition is an impression of moving back from 3D and "zooming out" from the common scene plane or planar region. Again, the third transition may involve a blend or a crossfade between the second computer-generated image and the second digital image.

In the embodiment of FIG. 9, a full frame image (i.e., the first digital image) is used to begin the overall transition (at the beginning of block 950) and a full frame image (i.e., the second digital image) is used to end the overall transition (at the end of block 970). In a related embodiment, instead of beginning and ending with a full frame image, the overall transition begins with the first computer-generated image and ends with the second computer generated image. In this embodiment, blocks 950 and 970 are excluded. In another related embodiment, the first and second digital images are cropped so that the projection in the starting and finishing view has straight sides. This approach may be visually more appealing and allows the use of improved transition without any distortion or warp artifacts.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
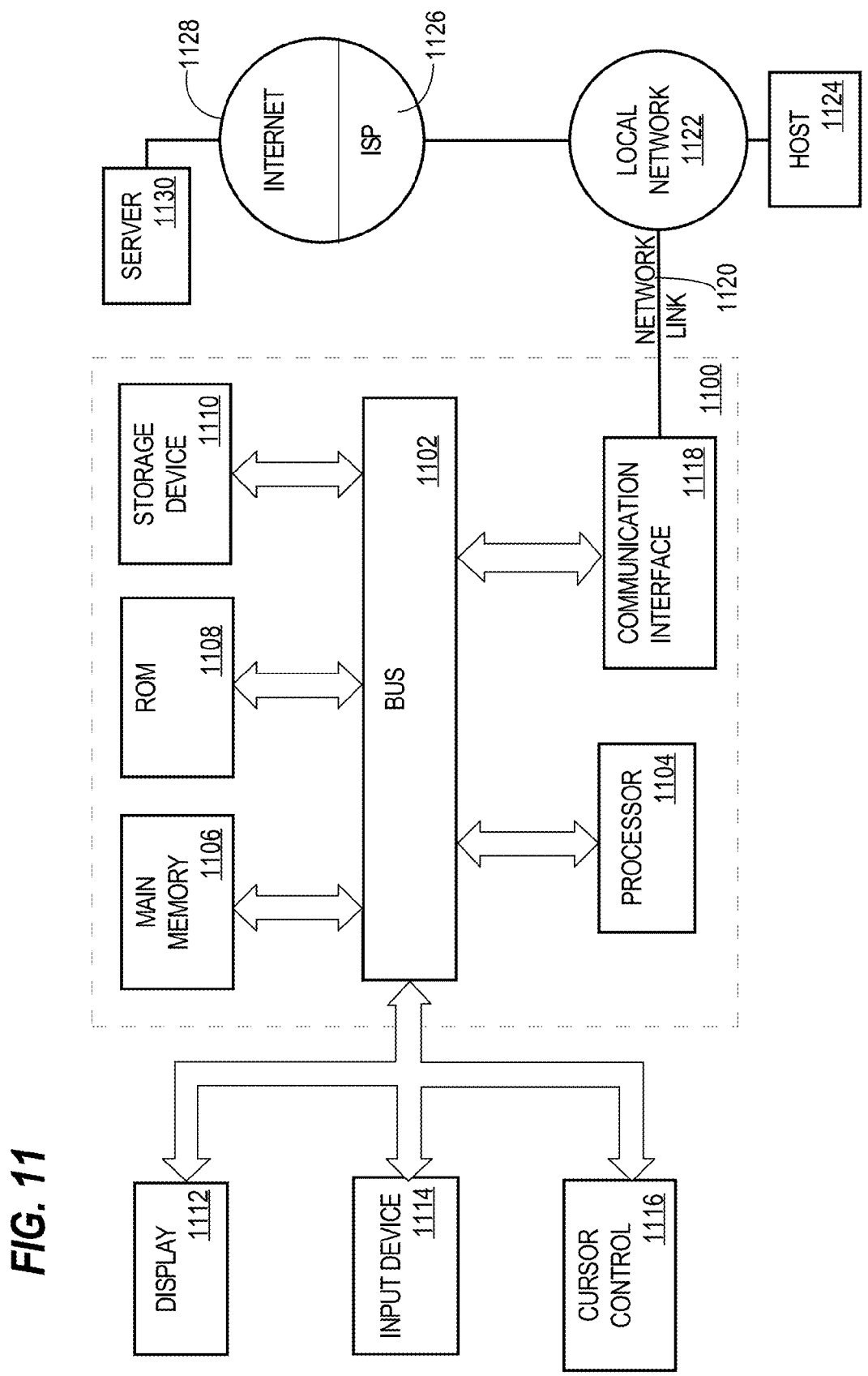
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more machine-readable storage media including instructions which, when executed by a machine, cause the machine to perform operations comprising:
    identifying a plurality of digital images that includes a first image including a first image region and a first plurality of descriptors and a second image including a second image region and a second plurality of descriptors, the first image region corresponding to the second image region;
    creating a first vector from the first plurality of descriptors and a second vector from the second plurality of descriptors, wherein the first plurality of descriptors and the second plurality of descriptors describe feature points of the first image region and the second image region respectively;
    determining, by comparing the first vector and the second vector, whether to associate the first image with the second image, by determining whether the first vector and the second vector share at least one descriptor; and
    causing, to be displayed on a display screen, the first image and at least a first portion of the second image such that the first image region is aligned with the second image region at a feature point corresponding to the at least one descriptor and at least a second portion of the second image is obstructed by the first image.

2. The one or more machine-readable storage media of claim 1, wherein the instructions, when executed by the machine, further causes:
    analyzing the plurality of digital images to identify a plurality of image regions reflected in one or more images of the plurality of digital images;
    storing, in association with the first image, image region data that indicates where one or more image regions, of the plurality of image regions, exist in the first image, wherein the one or more image regions includes the first image region.

3. The one or more machine-readable storage media of claim 1, wherein causing the first portion of the second image to be displayed comprises causing the first portion of the second image to be partially transparent.

4. The one or more machine-readable storage media of claim 1, wherein the instructions, when executed by the machine, further causes:
    performing one or more transformations on the first image;
    wherein the one or more transformations include scaling, rotating, or translating the first image to align the first image region of the first image with the second image region of the second image.

5. The one or more machine-readable storage media of claim 1, wherein the instructions, when executed by the machine, further causes:

storing order data that indicates an order of the plurality of digital images while at least a portion of each image of the plurality of digital images is displayed concurrently;

wherein the order of the plurality of digital images is based on three-dimensional (3D) information associated with each image in the plurality of digital images.

6. The one or more machine-readable storage media of claim 5, wherein the 3D information includes image capture device position or image capture device pose.

7. The one or more machine-readable storage media of claim 1, wherein the instructions, when executed by the machine, further causes:

receiving input to cause the second image to be unobstructively displayed on the display screen, to cause a portion of the first image to be partially obstructed, to cause a third image of the plurality of digital images to be displayed without being obstructed by another image, and to cause a portion of the second image to be partially obstructed.

8. The one or more machine-readable storage media of claim 7, wherein the input is one of movement detected on a touch screen or movement of a cursor.

9. The one or more machine-readable storage media of claim 7, wherein the instructions, when executed by the machine, further causes:

based on a direction of motion indicated by the input and 3D information associated with each image of the plurality of digital images, determining which image of the plurality of digital images to display unobstructed by any other image in the plurality of digital images.

10. The one or more machine-readable storage media of claim 1, wherein the instructions, when executed by the machine, further causes:

wherein each descriptor of the first plurality of descriptors corresponds to a point in the first image;

wherein each descriptor of the second plurality of descriptors corresponds to a point in the second image;

determining a first set of visual words based on the first plurality of descriptors;

determining a first set of visual word frequencies based on the first set of visual words;

determining a second set of visual words based on the second plurality of descriptors;

determining a second set of visual word frequencies based on the second set of visual words;

performing a comparison of the first set of visual word frequencies with the second set of visual word frequencies; and wherein determining whether to associate the first image with the second image includes using the comparison.

11. The one or more machine-readable storage media of claim 10, wherein the instructions, when executed by the machine, further causes: prior to identifying the first plurality of descriptors:

analyzing the first image to identifying a first plurality of keypoints in the first image;

generating the first plurality of descriptors based on the plurality of keypoints.

12. The one or more machine-readable storage media of claim 10, wherein the instructions, when executed by the machine, further causes:

determining to associate the first image with the second image;

based on the first set of visual word frequencies and the second set of visual word frequencies, identifying a first set of points in the first image that correspond to a second set of points in the second image;

analyzing the first set of points and the second set of points to check for geometric consistency;

based on the analyzing, removing correspondences between a subset of the first set of points and a subset of the second set of points.

13. The one or more machine-readable storage media of claim 1, wherein the instructions identifying the plurality of digital images generate the first plurality of descriptors and the second plurality of descriptors from a first plurality of keypoints and a second plurality of keypoints respectively.

14. The one or more machine-readable storage media of claim 13, wherein the instructions generating the first plurality of descriptors and the second plurality of descriptors use a keypoint detection technique selected from the following group of techniques:

SIFT (Scale-invariant feature transform);
SURF (Speeded Up Robust Features); and
ORB (Oriented FAST and Rotated BRIEF).

15. The one or more machine-readable storage media of claim 1, wherein the instructions, when executed by the machine, further causes:

quantizing and mapping the first plurality of descriptors into a first plurality of visual words, wherein the first plurality of visual words is smaller than the first plurality of descriptors;

quantizing and mapping the second plurality of descriptors into a second plurality of visual words, wherein the second plurality of visual words is smaller than the second plurality of descriptors; and wherein determining whether to associate the first image with the second image includes comparing the first plurality of visual words with the second plurality of visual words.

16. A method comprising:
using a hardware processor:

identifying a plurality of digital images that includes a first image including a first image region and a first plurality of descriptors and a second image including a second image region and a second plurality of descriptors, the first image region corresponding to the second image region;

creating a first vector from the first plurality of descriptors and a second vector from the second plurality of descriptors, wherein the first plurality of descriptors and the second plurality of descriptors describe feature points of the first image region and the second image region respectively;

determining, by comparing the first vector and the second vector, whether to associate the first image with the second image, by determining whether the first vector and the second vector share at least one descriptor; and causing, to be displayed on a display screen, the first image and at least a first portion of the second image such that the first image region is aligned with the second image region at a feature point corresponding to the at least one descriptor and at least a second portion of the second image is obstructed by the first image.

17. The method of claim 16, further comprising:

analyzing the plurality of digital images to identify a plurality of image regions reflected in one or more images of the plurality of digital images;

storing, in association with the first image, image region data that indicates where one or more image regions, of the plurality of image regions, exist in the first image, wherein the one or more image regions includes the first image region.

18. The method of claim 16, wherein causing the first portion of the second image to be displayed comprises causing the first portion of the second image to be partially transparent.

19. The method of claim 16, further comprising:
performing one or more transformations on the first image;
wherein the one or more transformations include scaling, rotating, or translating the first image to align the first image region of the first image with the second image region of the second image.

20. The method of claim 16, further comprising:
storing order data that indicates an order of the plurality of digital images while at least a portion of each image of the plurality of digital images is displayed concurrently;
wherein the order of the plurality of digital images is based on three-dimensional (3D) information associated with each image in the plurality of digital images.

21. The method of claim 20, wherein the 3D information includes image capture device position or image capture device pose.

22. The method of claim 16, further comprising:
receiving input to cause the second image to be unobstructively displayed on the display screen, to cause a portion of the first image to be partially obstructed, to cause a third image of the plurality of digital images to be displayed without being obstructed by another image, and to cause a portion of the second image to be partially obstructed.

23. The method of claim 22, wherein the input is one of movement detected on a touch screen or movement of a cursor.

24. The method of claim 22, further comprising:
based on a direction of motion indicated by the input and 3D information associated with each image of the plurality of digital images, determining which image of the plurality of digital images to display unobstructed by any other image in the plurality of digital images.

25. The method of claim 16, further comprising:
wherein each descriptor of the first plurality of descriptors corresponds to a point in the first image;
wherein each descriptor of the second plurality of descriptors corresponds to a point in the second image;
determining a first set of visual words based on the first plurality of descriptors;
determining a first set of visual word frequencies based on the first set of visual words;
determining a second set of visual words based on the second plurality of descriptors;
determining a second set of visual word frequencies based on the second set of visual words;
performing a comparison of the first set of visual word frequencies with the second set of visual word frequencies; and
wherein determining whether to associate the first image with the second image includes using the comparison.

26. The method of claim 25, further comprising, prior to identifying the first plurality of descriptors:
analyzing the first image to identifying a first plurality of keypoints in the first image;
generating the first plurality of descriptors based on the plurality of keypoints.

27. The method of claim 25, further comprising:
determining to associate the first image with the second image;
based on the first set of visual word frequencies and the second set of visual word frequencies, identifying a first set of points in the first image that correspond to a second set of points in the second image;
analyzing the first set of points and the second set of points to check for geometric consistency;
based on the analyzing, removing correspondences between a subset of the first set of points and a subset of the second set of points.

\* \* \* \* \*